United States Patent
Park

(10) Patent No.: US 9,448,587 B2
(45) Date of Patent: Sep. 20, 2016

(54) DIGITAL DEVICE FOR RECOGNIZING DOUBLE-SIDED TOUCH AND METHOD FOR CONTROLLING THE SAME

(71) Applicant: LG ELECTRONICS INC., Seoul (KR)

(72) Inventor: Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 417 days.

(21) Appl. No.: 13/797,436

(22) Filed: Mar. 12, 2013

(65) Prior Publication Data

US 2014/0218309 A1 Aug. 7, 2014

(30) Foreign Application Priority Data

Feb. 6, 2013 (KR) ........................ 10-2013-0013512

(51) Int. Cl.
*G06F 3/041* (2006.01)
*G06F 1/16* (2006.01)
*G06F 3/0488* (2013.01)
*G06F 3/0354* (2013.01)

(52) U.S. Cl.
CPC ............ *G06F 1/1626* (2013.01); *G06F 1/169* (2013.01); *G06F 3/03547* (2013.01); *G06F 3/04883* (2013.01); *G06F 2200/1636* (2013.01)

(58) Field of Classification Search
CPC ...................................................... G06F 3/041
USPC ................................................ 345/156–184
See application file for complete search history.

(56) References Cited

U.S. PATENT DOCUMENTS

| 8,055,305 | B2 | 11/2011 | Cho et al. | |
|---|---|---|---|---|
| 8,416,148 | B1* | 4/2013 | Park | G06F 3/041 345/1.1 |
| 2009/0184935 | A1* | 7/2009 | Kim | G06F 3/0416 345/173 |
| 2009/0315834 | A1 | 12/2009 | Nurmi et al. | |
| 2010/0007618 | A1* | 1/2010 | Park | G06F 1/1626 345/173 |
| 2010/0099394 | A1* | 4/2010 | Hainzl | G06F 1/32 455/418 |
| 2010/0134423 | A1* | 6/2010 | Brisebois | G06F 3/03547 345/173 |
| 2010/0277420 | A1 | 11/2010 | Charlier et al. | |
| 2011/0148915 | A1* | 6/2011 | Kim | G06F 1/1626 345/619 |
| 2011/0316807 | A1* | 12/2011 | Corrion | G06F 345/174 345/174 |
| 2012/0075212 | A1 | 3/2012 | Park et al. | |
| 2012/0324381 | A1* | 12/2012 | Cohen | G06F 3/04886 715/765 |
| 2013/0007653 | A1* | 1/2013 | Stolyarov | G06F 1/1626 715/784 |
| 2013/0159931 | A1* | 6/2013 | Lee | G06F 1/1671 715/835 |

FOREIGN PATENT DOCUMENTS

EP 2 434 385 A2 3/2012
KR 20-2013-0000786 U 2/2013

* cited by examiner

*Primary Examiner* — Carolyn R Edwards
(74) *Attorney, Agent, or Firm* — Birch, Stewart, Kolasch & Birch, LLP

(57) ABSTRACT

A digital device for recognizing a double-sided touch and a method for controlling the same are disclosed. The digital device for recognizing a double-sided touch includes a front display unit, a sensor unit configured to detect a touch input and transmit an input signal based on the detected touch input to a processor, and the processor configured to control the front display unit and the sensor unit. The processor is configured to identify an input pattern to the digital device using a first input signal, determine whether to activate touch sensing on a rear surface of the digital device according to the identified input pattern, provide a touch sensing area on the rear surface of the digital device, when touch sensing on the rear surface of the digital device is activated.

21 Claims, 18 Drawing Sheets

DIGITAL DEVICE FOR RECOGNIZING DOUBLE-SIDED TOUCH AND METHOD FOR CONTROLLING THE SAME

This application claims the benefit of Korean Patent Application No. 10-2013-0013512, filed on Feb. 6, 2013, which is hereby incorporated by reference as if fully set forth herein.

BACKGROUND OF THE DISCLOSURE

1. Field of the Disclosure

The disclosure relates to a digital device for recognizing a double-side touch and a method for controlling the same, and more particularly, to a method for controlling a front display using a rear-side touch in a digital device for recognizing a double-sided touch.

2. Discussion of the Related Art

Along with technology development, handheld digital devices such as smart phones, tablet PCs, etc. have gained more and more popularity. Due to small size and light-weight, the handheld digital devices can ensure mobility for users. A user can select and use content, an application, etc. with one hand in a handheld device, while holding the handheld device with the same hand. Accordingly, the handheld digital device can execute an application, content, etc. suitable for the right or left hand by recognizing the user's hand that grabs the handheld digital device.

The user may select an intended list and shift to another position by moving a cursor with a finger, while holding the handheld digital device. If the user wants to touch a point beyond reach of the user's hand grabbing the handheld digital device in a touchable area of the handheld digital device, the user may transfer the handheld digital device to the other hand or touch the point with the other hand.

SUMMARY OF THE DISCLOSURE

Accordingly, the disclosure is directed to a digital device for recognizing a double-sided touch and a method for controlling the same that substantially obviate one or more problems due to limitations and disadvantages of the related art.

An object of the disclosure is to activate a rear-side touch on a digital device using a user's input pattern to the digital device.

Another object of the disclosure is to activate a touch sensing area of the rear surface of a digital device and determine the size and position of the touch sensing area based on a user's input pattern.

A further object of the disclosure is to control a front display of a digital device based on an input signal to a touch sensing area defined on the rear surface of the digital device.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a digital device for recognizing a double-sided touch includes a front display unit, a sensor unit configured to detect a touch input and transmit an input signal based on the detected touch input to a processor, and the processor configured to control the front display unit and the sensor unit. The processor is configured to identify an input pattern to the digital device using a first input signal, determine whether to activate touch sensing on a rear surface of the digital device according to the identified input pattern, provide a touch sensing area on the rear surface of the digital device, when touch sensing on the rear surface of the digital device is activated, wherein the touch sensing area is determined based on at least one of a position of a first point on a first side surface of the digital device and a position of a second point on a second side surface opposite to the first side surface, and wherein the first and second points are determined based on the input pattern, and control content displayed on the front display unit according to a second input signal to the touch sensing area.

In another aspect of the disclosure, a method for controlling a digital device for recognizing a double-sided touch includes detecting a first input signal, identifying an input pattern to the digital device using the first input signal, determining whether to activate touch sensing on a rear surface of the digital device according to the identified input pattern, providing a touch sensing area on the rear surface of the digital device, when touch sensing on the rear surface of the digital device is activated, wherein the touch sensing area is determined based on at least one of a position of a first point on a first side surface of the digital device and a position of a second point on a second side surface opposite to the first side surface, and the first and second points are determined based on the input pattern, detecting a second input signal to the touch sensing area, and controlling content displayed on a front display unit according to the second input signal.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Although the terms used in the disclosure are selected from generally known and used terms, the terms may be changed according to the intention of an operator, customs, or the advent of new technology. Some of the terms mentioned in the disclosure have been selected by the applicant at his or her discretion, the detailed meanings of which are described in relevant parts of the description herein. Therefore, the disclosure must be understood, not simply by the actual terms used but by the meanings of each term lying within.

Embodiments will be described below in detail with reference to the attached drawings and content of the drawings, which should not be construed as limiting the embodiments.

Figure 1:
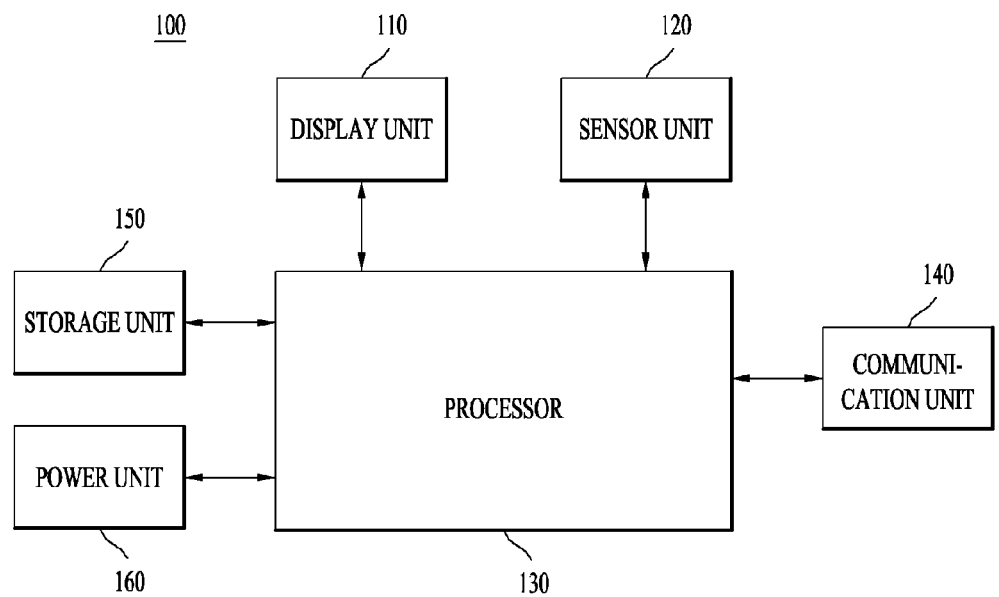
FIG. 1 is a block diagram of a digital device for recognizing a double-sided touch.

FIG. 1 is a block diagram of a digital device for recognizing a double-sided touch. Referring to FIG. 1, a digital device 100 for recognizing a double-sided touch (referred to shortly as a digital device 100) may include a display unit 110, a sensor unit 120, a processor 130, a communication unit 140, a storage unit 150, and a power unit 160.

The term 'digital device' may cover a broad range of digital devices capable of displaying an image and conducting data communication, including a PC, a Personal Digital Assistant (PDA), a laptop computer, a tablet PC, a smart phone, etc. In the disclosure, the digital device 100 may be any digital device equipped with a touch screen.

The display unit 110 outputs an image on a display screen. The display unit 110 may output an image according to content executed in the processor 130 or a control command received from the processor 130. The display unit 110 may be disposed on the front surface of the digital device 100 in the disclosure. The display unit 110 may also display content in the disclosure. For example, the content may include a video, an image, etc.

The sensor unit 120 may detect a user input using at least one sensor equipped in the digital device 100 and provide an input signal corresponding to a detection result to the processor 130. The sensor unit 120 may include a plurality of sensing means. In an embodiment, the plurality of sensing means may include a gravity sensor, a geomagnetic sensor, a motion sensor, a gyro sensor, an acceleration sensor, an infrared sensor, an inclination sensor, an illuminance sensor, an altitude sensor, an odor sensor, a temperature sensor, a depth sensor, a pressure sensor, a bending sensor, an audio sensor, a video sensor, a Global Positioning System (GPS) sensor, a grip sensor, a touch sensor, etc. The sensor unit 120 generically refers to these various sensing means. The sensor unit 120 may sense various user inputs and user environments and provide sensing results to the processor 130 so that the processor 130 may perform operations corresponding to the sensing results. The above-described sensors may be included as separate elements or may be incorporated into one or more elements in the digital device 100.

In the disclosure, the sensor unit 120 may detect various user inputs. The user inputs may include a touch input, a gesture input, a voice input, etc. The sensor unit 120 may detect various input patterns to the digital device 100. The input patterns may include a grip pattern on both side surfaces of the digital device 100, a touch pattern on the front or rear surface of the digital device 100, etc. The sensor unit 120 may also detect first and second input signals in the digital device 100 according to the disclosure. For example, the first input signal may include a signal for activating touch sensing on the rear surface of the digital device 100, and the second input signal may include a touch signal or hovering signal in a touch sensing area. Hovering means that a user's hand or an object stays above an intended touch point by a predetermined distance, without directly touching a screen.

In the disclosure, the sensor unit 120 may include a grip sensor and a touch sensor. For example, grip sensors may be positioned on both side surfaces of the digital device 100. When the user's hand touches the digital device 100, the grip sensors may generate sensing signals according to the touch pattern of touching fingers and provide the sensing signals to the processor 130. For example, touch sensors may be positioned on the front and rear surfaces of the digital device 100. However, the touch sensor on the rear surface of the digital device 100 may recognize a touch input, only when touch sensing on the rear surface of the digital device 100 is activated.

The processor 130 may execute content received through data communication or stored in the storage unit 150. The processor 130 may also execute various applications and process data within the digital device 100. The processor 130 may control each unit of the digital device 100 and data transmission and reception between units.

In the disclosure, the processor 130 may identify an input pattern to the digital device 100 using an input signal received from the sensor unit 120. The input pattern may be a grip pattern on both side surfaces of the digital device 100, a touch pattern on the front surface or rear surface of the digital device 100, or the like. The processor 130 may determine whether to activate touch sensing on the rear surface of the digital device 100 according to the input pattern. If touch sensing on the rear surface of the digital device 100 is activated, the processor 130 may provide a touch sensing area on the rear surface of the digital device 100. The touch sensing area on the rear surface of the digital device 100 may occupy at least a part of a user input-detectable area of the rear surface of the digital device 100. The user input may be a touch input, a hovering input, etc. In this case, the processor 130 may control content displayed on a front display unit in correspondence with an input signal to the touch sensing area.

The communication unit 140 may communicate with an external device in conformance to various protocols and thus transmit data to or receive data from the external device. The communication unit 140 may be connected to a network wirelessly or by wire and thus transmit or receive digital data such as content to or from the network. In the disclosure, the digital device 100 may transmit data to or receive data from an external device or a server through the communication unit 140. The communication unit 140 may be optional for the digital device 100.

The storage unit 150 may store various digital data including a video, an audio, pictures, applications, etc. The storage unit 150 may include various digital data storage spaces such as a flash memory, a Random Access Memory (RAM), a Solid State Drive (SDD), etc.

The power unit 160 is a power source connectable to an internal battery of the digital device 100 or an external power source, for supplying power to the digital device 100.

The digital device 100 illustrated in FIG. 1 is shown in block form according to an embodiment. Separate blocks are logically distinguished elements in the digital device 100. Therefore, the above-described elements of the digital device 100 may be implemented on one or more chips according to a device design.

Figure 2:
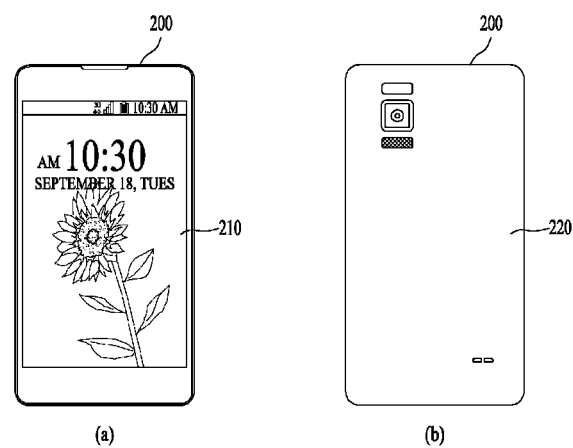
FIG. 2 illustrates the digital device for recognizing a double-sided touch.
Figure 2:
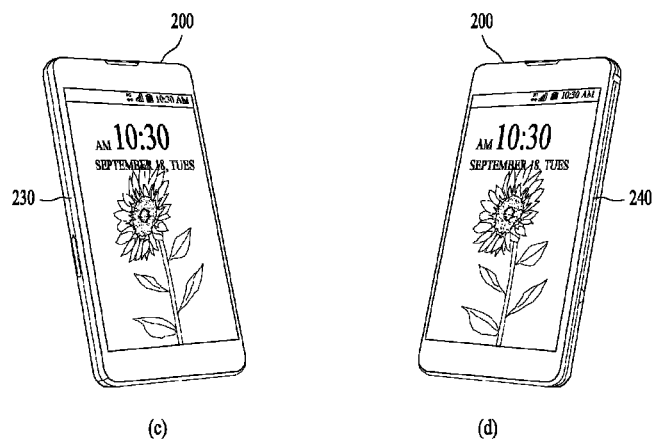

FIG. 2 illustrates the digital device for recognizing a double-sided touch. The front surface 210, rear surface 220, and side surfaces 230 and 240 of a digital device 200 are shown in FIG. 2.

Referring to FIG. 2(a), the digital device 200 may include a front display unit 210. In the disclosure, the digital device 200 may display content, an application, etc. on the front display unit 210. Further, the digital device 200 may detect an input signal to the front display unit 210 and control content displayed on the front display unit 210 in correspondence with the detected input signal.

Referring to FIG. 2(b), the digital device 200 may have a touch sensing area defined on its rear surface 220. As described before with reference to FIG. 1, a touch sensor disposed on the rear surface 220 of the digital device 200 may sense an input signal to the touch sensing area. The touch sensing area may cover an entire or partial area of the rear surface 220 of the digital device 200. The digital device 200 may determine whether to activate the touch sensing area based on a detected input signal in the digital device 200. When the touch sensing area is activated, the digital device 200 may control content displayed on the front display unit 210 based on a rear-side touch. In one embodiment, if the detected input signal is a grip pattern on both side surfaces of the digital device 200, the digital device 200 may activate the touch sensing area of the rear surface 220. In another embodiment, if the detected input signal is a preset input pattern to the front surface 210 or rear surface 220 of the digital device 200, the digital device 200 may activate the touch sensing area of the rear surface 220. The preset input pattern may include a touch on an icon for activating the touch sensing area. On the other hand, if the touch sensing area is not activated, the digital device 200 may not sense a rear-side touch.

Referring to FIGS. 2(c) and 2(d), the digital device 200 may include grip sensors on the side surfaces 230 and 240 and detect input signals through the grip sensors. More specifically, as described before with reference to FIG. 1, the digital device 200 may detect signals representing a user's grip pattern on the digital device 200 through the grip sensors disposed on the side surfaces 230 and 240 of the digital device 200. Therefore, the digital device 200 may recognize the user's grip pattern through the grip sensors. For example, if the grip pattern is a grip covering the rear surface of the digital device 200, the grip sensors on the left and right side surfaces 230 and 240 of the digital device 200 may detect finger touches. For example, if more areas are touched on the left side surface 230 than on the right side surface 240, the digital device 200 may determine that the user is holding the digital device 200 with the right hand. In another example, if more areas are touched on the right side surface 240 than on the left side surface 230, the digital device 200 may determine that the user is holding the digital device 200 with the left hand.

Figure 3A:
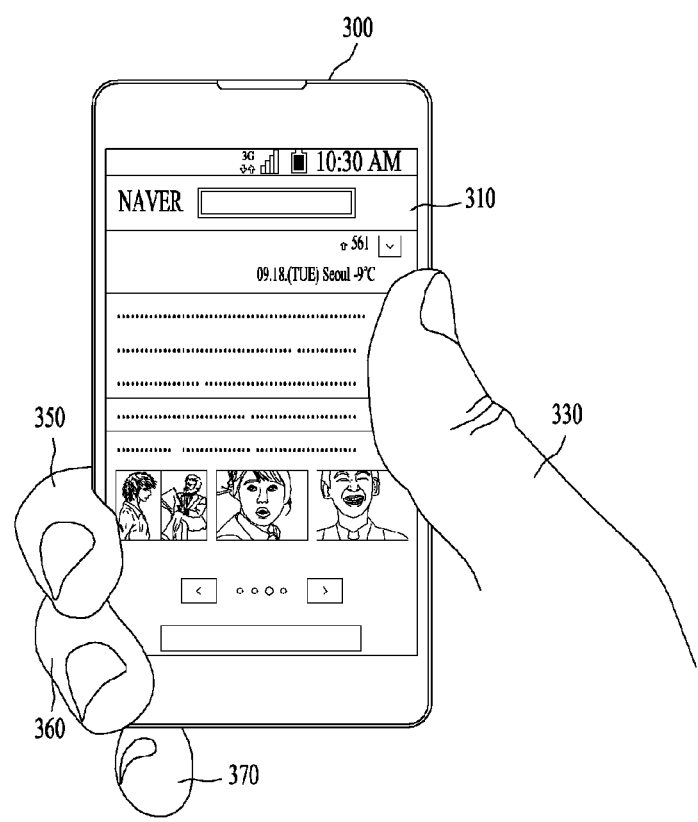
FIGS. 3A and 3B illustrate a grip pattern on the digital device for recognizing a double-sided touch.
Figure 3B:
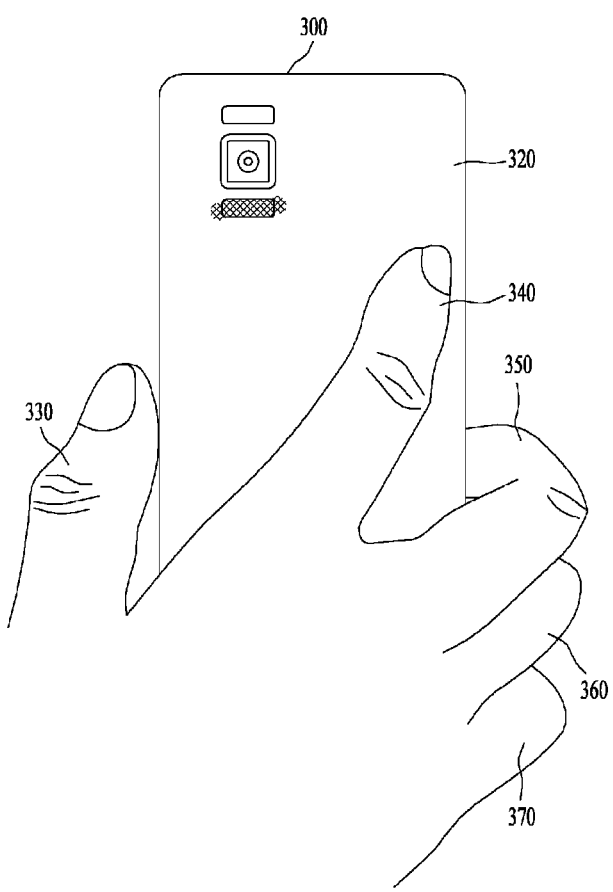

FIGS. 3A and 3B illustrate a grip pattern on the digital device for recognizing a double-sided touch. Specifically, FIGS. 3A and 3B illustrate a pattern of touching a digital device 300 with a user's fingers, when the user grabs the digital device 300.

In the disclosure, the digital device 300 may be a handheld digital device that can be grabbed with one hand. In this case, the digital device 300 may be grabbed with a user's right hand or left hand. For example, FIG. 3A illustrates a front display unit 310 of the digital device 300, when the user grabs the digital device 300 with the right hand, and FIG. 3B illustrates the rear surface 320 of the digital device 300, when the user grabs the digital device 300 with the right hand. In this case, the user's thumb 330 may touch a right side of the front surface of the digital device 300, while the user's index finger 340 may touch the rear surface 320 of the digital device 300. In addition, the user's middle finger 350 and ring finger 360 may touch the left side surface of the digital device 300, while the user's little finger 370 may support the bottom of the digital device 200, touching the bottom side surface of the digital device 300.

If the size of the digital device 300 is about 4 inches or smaller, the user may execute content, an application, etc. by touching the front display unit 310 with one hand, while holding the digital device 300 with the same hand. However, if the user's hand is relatively small, the user may have difficulty in freely touching any area of the front display unit 310 with one hand, while holding the about 4-inch digital device 300 with the same hand, although the user can touch only a partial area of the front display unit 310 with the hand. Also, if the digital device 300 is larger than about 4 inches, it may be difficult for the user to freely touch any area of the front display unit 310 with one hand, while holding the digital device 300 with the same hand. Accordingly, the disclosure is intended to provide a method for enabling a user to readily manipulate the digital device 300 with one hand, while holding digital device 300 with the same hand. The method will be described with reference to FIGS. 4A to 10.

Figure 4A:
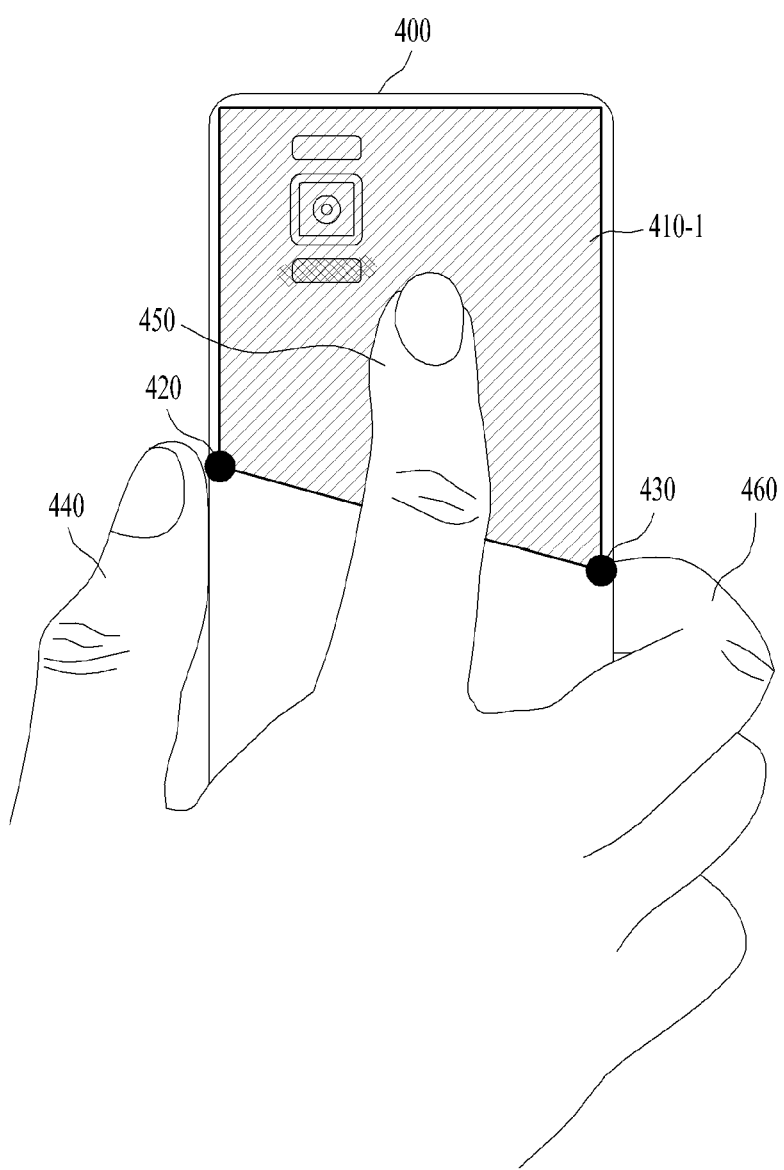
FIGS. 4A, 4B and 4C illustrate embodiments of a touch sensing area defined on the rear surface of the digital device for recognizing a double-sided touch.
Figure 4B:
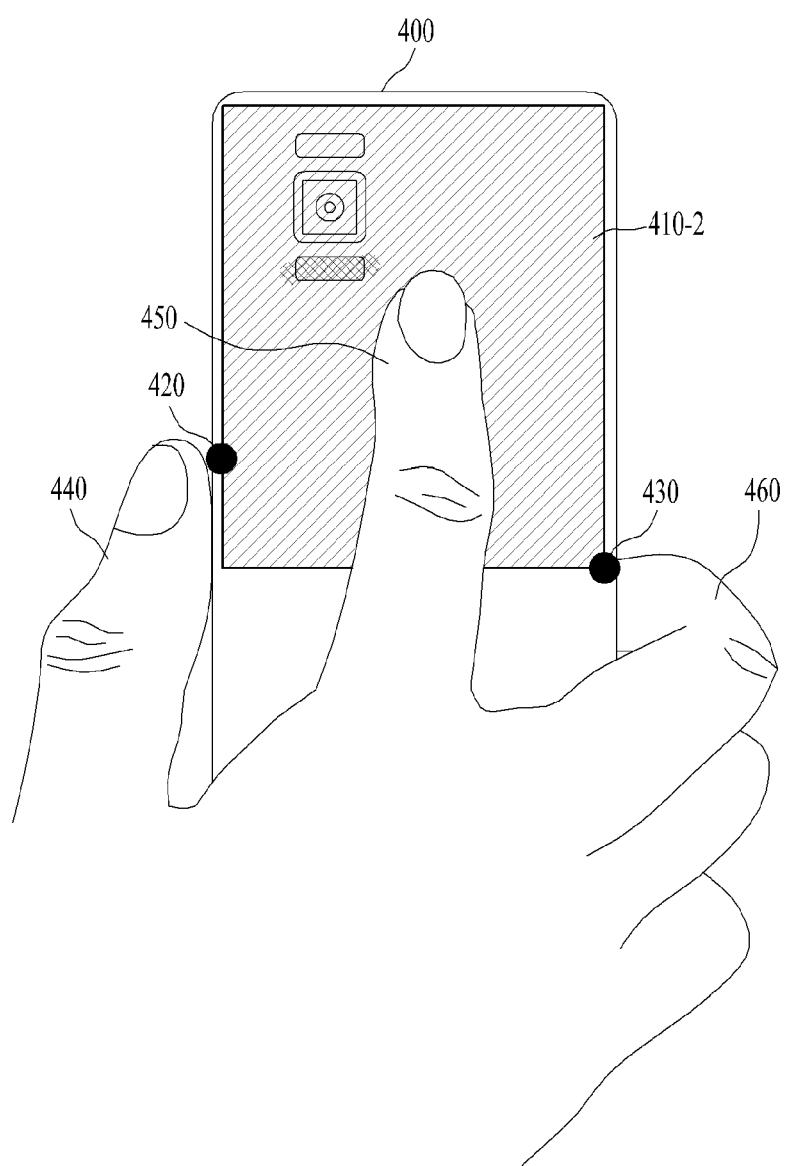
Figure 4C:
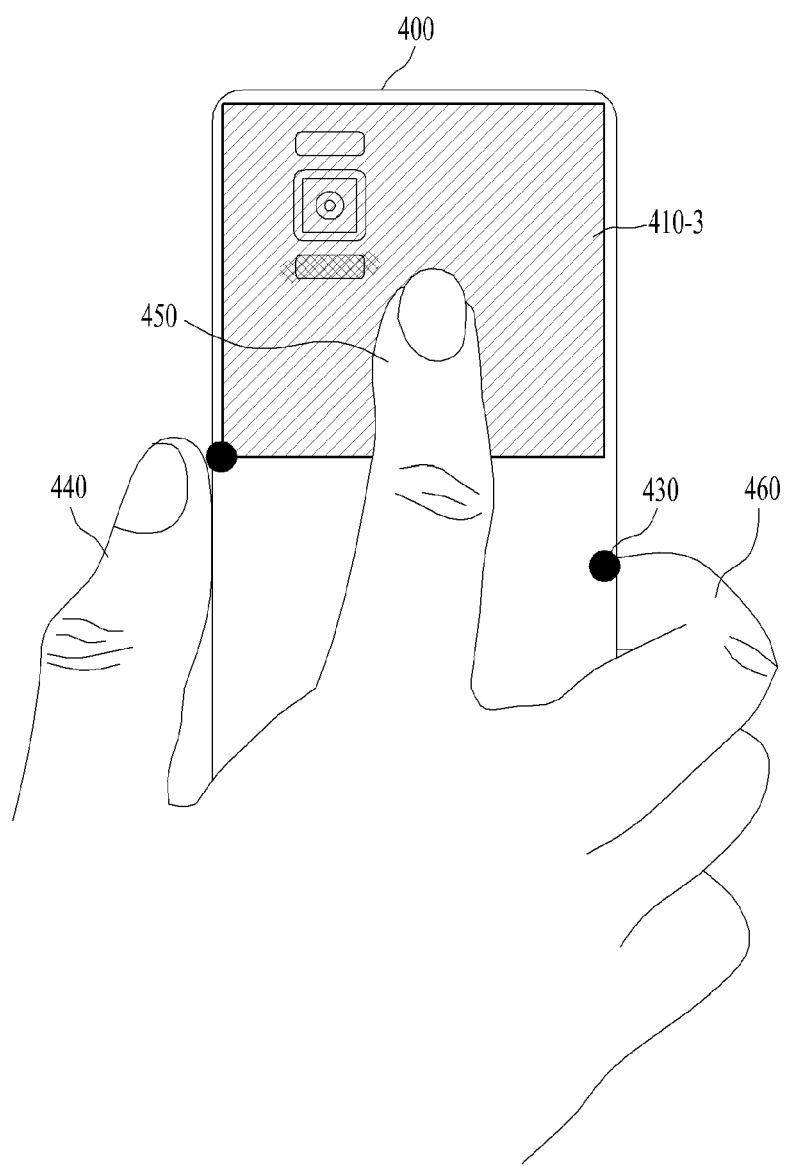

FIGS. 4A, 4B and 4C illustrate embodiments of the touch sensing area defined on the rear surface of the digital device for recognizing a double-sided touch. Specifically, FIGS. 4A, 4B and 4C illustrate touch sensing areas 410 on the rear surface of a digital device 400, which has been determined based on an input pattern.

First, as described before with reference to FIGS. 3A and 3B, a user may grab the digital device 400 with one hand. FIGS. 4A, 4B and 4C illustrate the rear surface of the digital device 400 grabbed with the user's right hand. The digital device 400 may identify an input pattern using a detected input signal. For example, the input signal may be a signal input to the digital device 400 by the user's hand. If input signals are detected from both side surfaces of the digital device 400, the input pattern may be a grip pattern of the user's hand. In this case, the digital device 400 may determine whether the grip pattern corresponds to a grip of the right hand or left hand. If an input signal is detected from the front surface or rear surface of the digital device 400, the input pattern may include a single touch, multiple touches, a touch and drag, a pinch, etc.

Next, the digital device 400 may then determine based on the identified input pattern whether to activate touch sensing on its rear surface. For example, if the identified input pattern is a preset grip pattern, the digital device 400 may activate touch sensing on the rear surface. The preset grip pattern may include a user's grip pressure imposed on the digital device 400 within a preset pressure range. For example, if the user's grip pressure on the digital device 400 is beyond the preset pressure range, touch sensing on the rear surface of the digital device 400 may not be activated. In addition, the preset grip pattern may correspond to a user's grip covering the rear surface of the digital device 400. For example, if the user's grip on the digital device 400 covers the front surface of the digital device 400, the digital device 400 may not activate touch sensing on its rear surface.

Also, when activating touch sensing on the rear surface, the digital device 400 may provide a touch sensing area 410. For example, the touch sensing area 410 may be defined on the rear surface of the digital device 400, based on at least one of the position of a first point 420 on a first side surface of the digital device 400 and the position of a second point 430 on a second side surface of the digital device 400 opposite to the first side surface. The first and second points 420 and 430 may be determined based on an input pattern. The first point 420 may be the uppermost point among one or more points on the first side surface in the identified grip pattern. The second point 430 may be the uppermost point among one or more points on the second side surface in the identified grip pattern. Referring to FIGS. 4A, 4B and 4C, the first side surface may be to the left of the rear surface of the digital device 400 and the second side surface may be to the right of the rear surface of the digital device 400. For example, referring to FIGS. 4A, 4B and 4C, the user's thumb 440 may touch the first side surface and the first point 420 may be the uppermost point among points at which the thumb 440 touches the digital device 400. The user's middle finger 460 and the user's ring finger and little finger may touch the second side surface and the second point 430 may be the uppermost point among points at which the middle finger 460 touches the digital device 400.

Figure 7A:
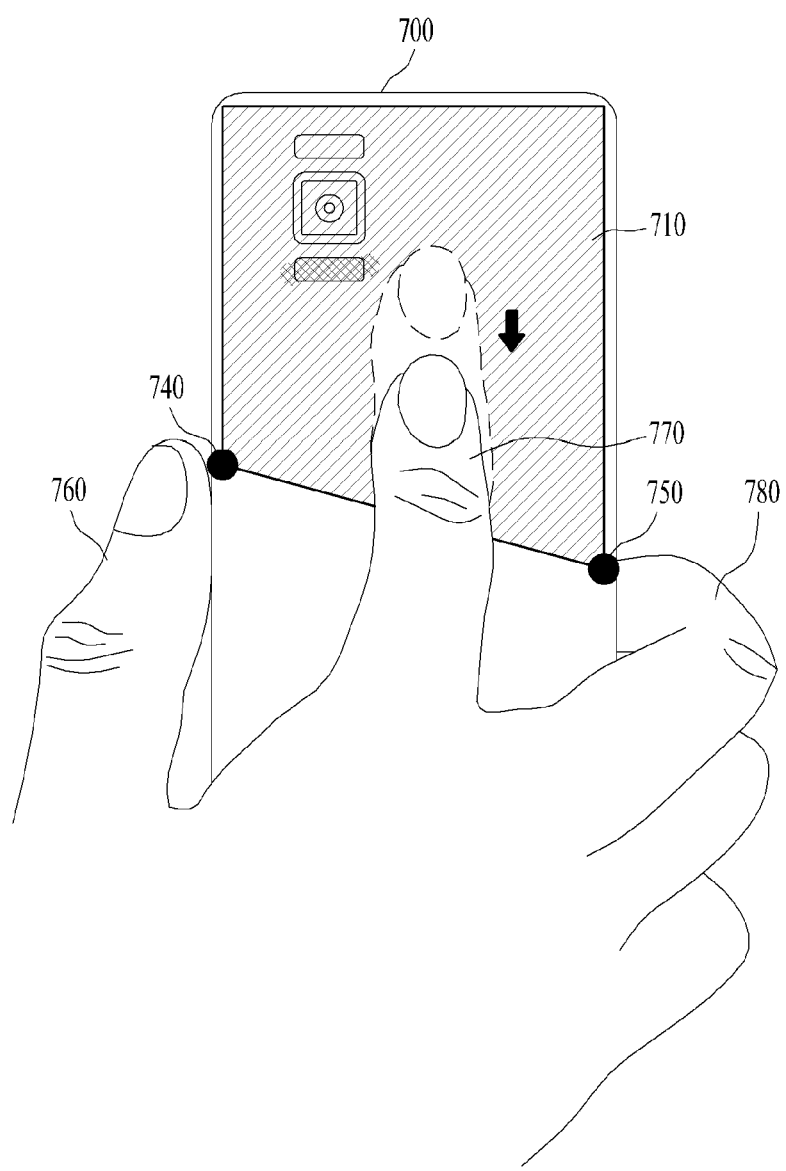
FIGS. 7A, 7B and 7C illustrate an embodiment for controlling content displayed on a front display according to an input signal to the touch sensing area on the rear surface of the digital device for recognizing a double-sided touch.
Figure 7B:
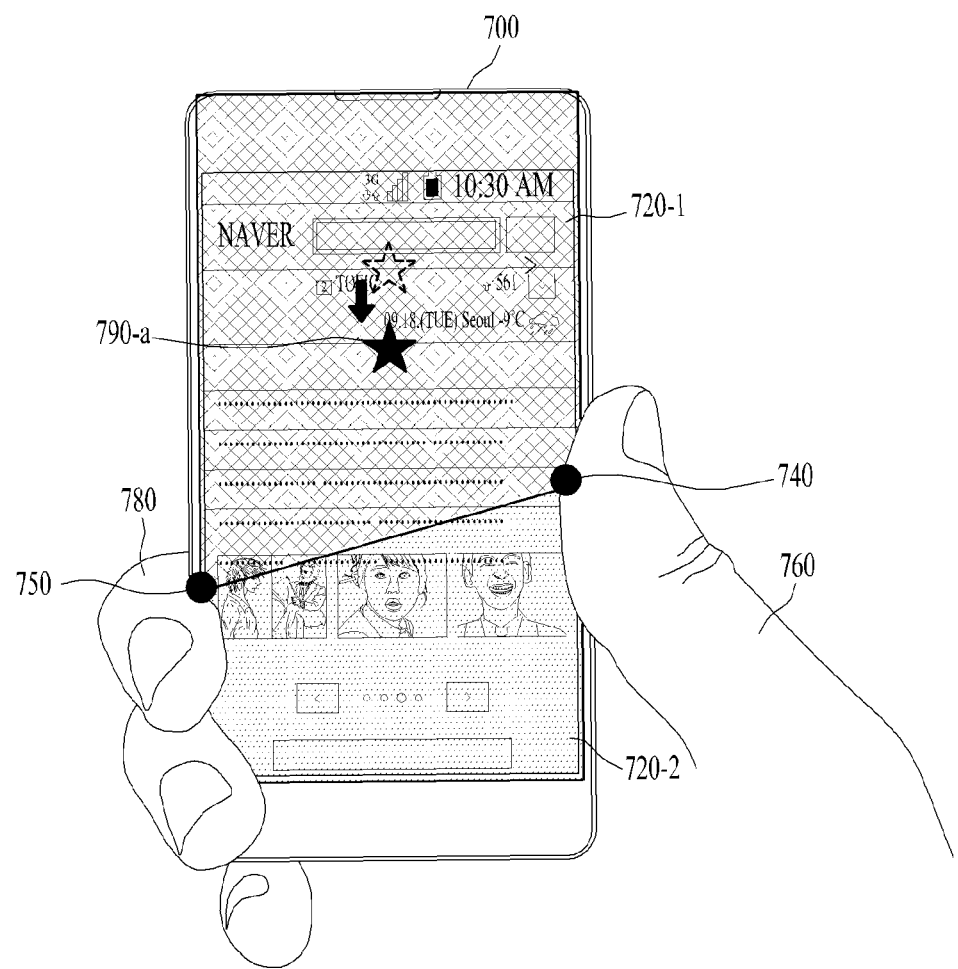
Figure 7C:
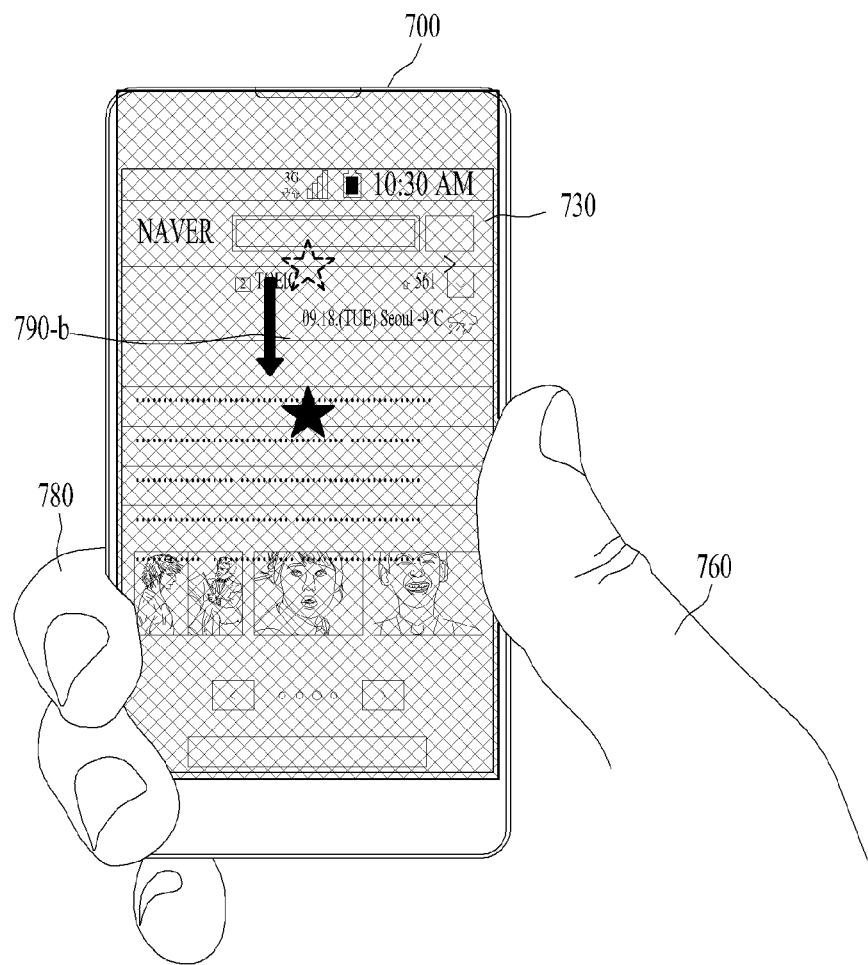

In one embodiment, the touch sensing area 410 may include an upper area above a line connecting the first point 420 to the second point 430. Referring to FIG. 4A, a touch sensing area 410-1 may be an upper area above a line connecting between the first and second points 420 and 430 on the rear surface of the digital device 400. In this case, the digital device 400 may readily control content displayed on a front display unit (not shown) of the digital device 400 by detecting an input signal to the touch sensing area 410-1. This is because the user may have difficulty in touching an area of the front display unit corresponding to the touch sensing area 410-1 of the rear surface of the digital device 400 with one hand, while holding the digital device 400 with the same hand. With reference to FIGS. 7A, 7B and 7C, control of the front display unit of the digital device 400 using the touch sensing area 410-1 will be described later.

Figure 8A:
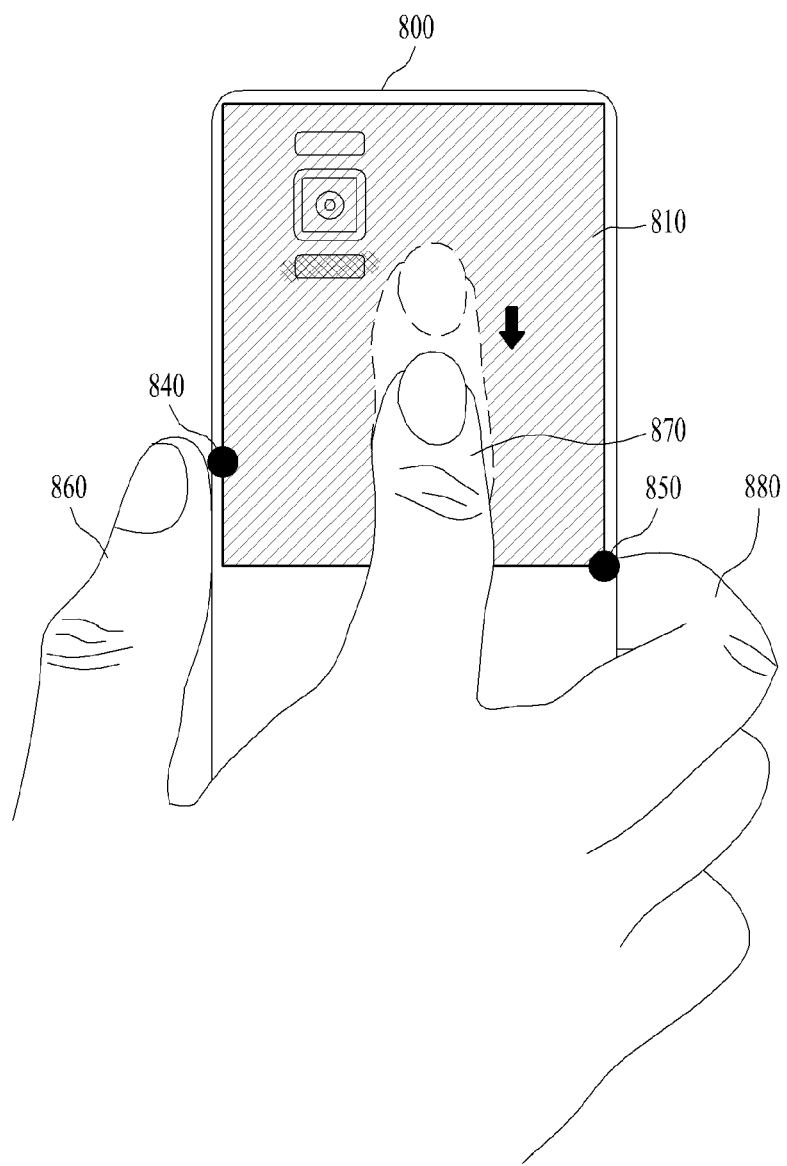
FIGS. 8A, 8B and 8C illustrate another embodiment for controlling content displayed on the front display according to an input signal to the touch sensing area on the rear surface of the digital device for recognizing a double-sided touch.
Figure 8B:
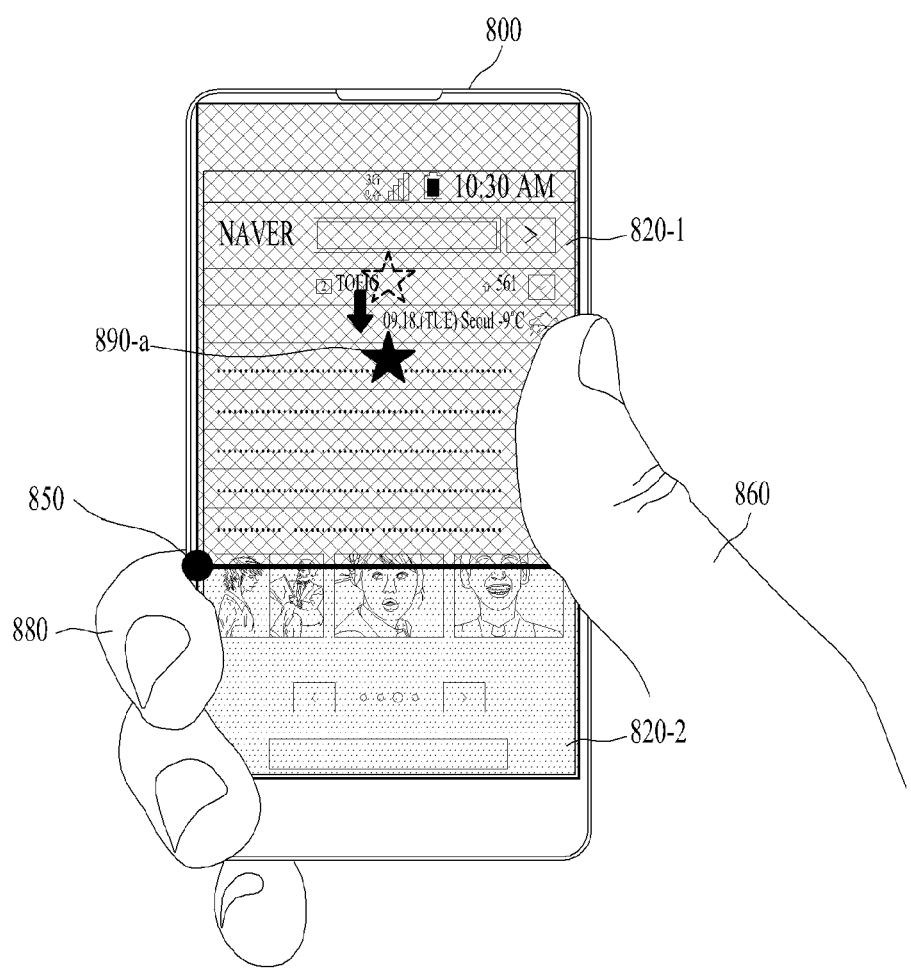
Figure 8C:
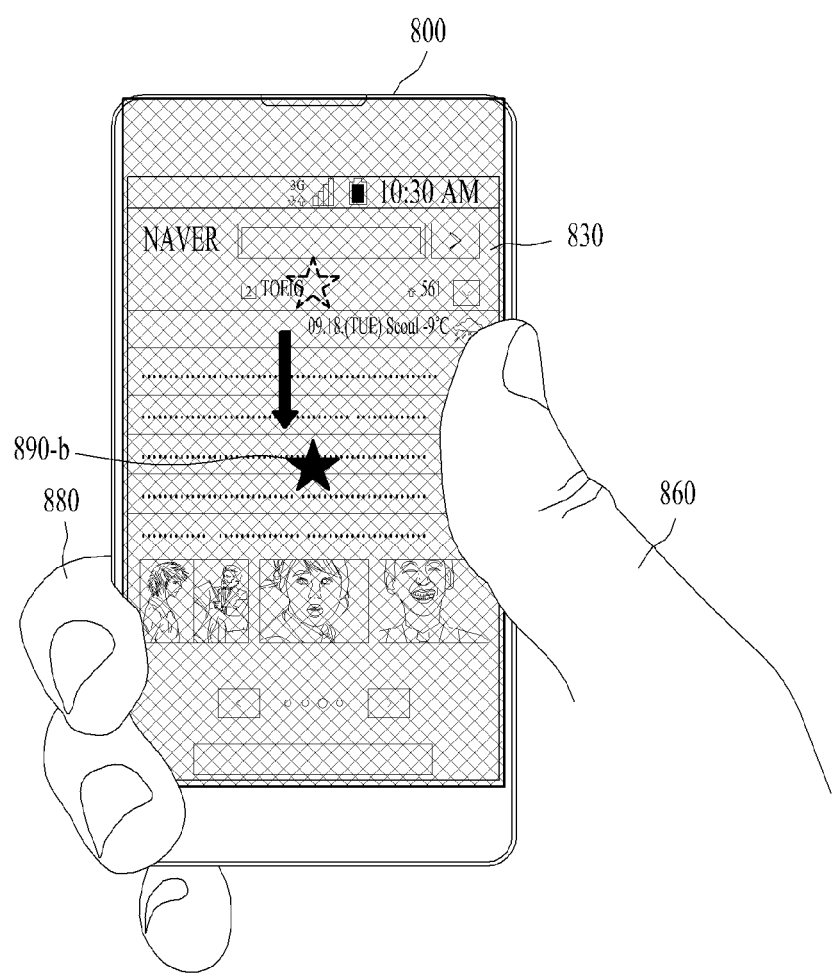

In another embodiment, the touch sensing area 410 may include an upper area above the lower point between the first and second points 420 and 430. Referring to FIG. 4B, a touch sensing area 410-2 may be defined as an upper area above the lower point (herein, the second point 430) between the first and second points 420 and 430 on the rear surface of the digital device 400. In this case, the digital device 400 may readily control content displayed on the front display unit of the digital device 400 by detecting an input signal to the touch sensing area 410-2. With reference to FIGS. 8A, 8B and 8C, control of the front display unit of the digital device 400 using the touch sensing area 410-2 will be described later.

In another embodiment, the touch sensing area 410 may include an upper area above the higher point between the first and second points 420 and 430. Referring to FIG. 4C, a touch sensing area 410-3 may be defined as an upper area above the higher point (herein, the first point 420) between the first and second points 420 and 430 on the rear surface of the digital device 400. In this case, the digital device 400 may readily control content displayed on the front display unit of the digital device 400 by detecting an input signal to the touch sensing area 410-3.

In another embodiment, the touch sensing area 410 may include a rectangular area of a predetermined size. The position of the rectangular area may be determined according to the position of an index finger 450. The rectangular area may be smaller than the touch sensing areas 410 illustrated in FIGS. 4A, 4B and 4C. For example, the rectangular area may be of size 3 cm×3 cm. In this case, the user's index finger 450 may be disposed at a different position according to a user's grip pattern. As the position of the user's index finger 450 is changed, the touch sensing area 410 may be disposed at a position that is easily touchable with the index finger 450. Therefore, the user can easily control the display of the front display unit of the digital device 400.

Meanwhile, if the user's grip pattern on the digital device 400 is changed, the touch sensing area 410 may also be changed. For example, the user may shift his or her grip to a lower part of the digital device 400 with passage of time, maintaining the grip shape of the hand illustrated in FIG. 4A. As a result of changing the grip pattern in this manner, the touch sensing area 410-1 illustrated in FIG. 4A may become larger downward. On the contrary, the user may shift his or her grip to a higher part of the digital device 400 with passage of time, maintaining the grip shape of the hand illustrated in FIG. 4A. As a result of changing the grip pattern in this manner, the touch sensing area 410-1 illustrated in FIG. 4A may become smaller upward. Accordingly, since the touch sensing area 400 is provided based on a hand's grip of the digital device 400, the digital device 400 may be placed in an optimized state for the user's read-side touch.

Figure 5:
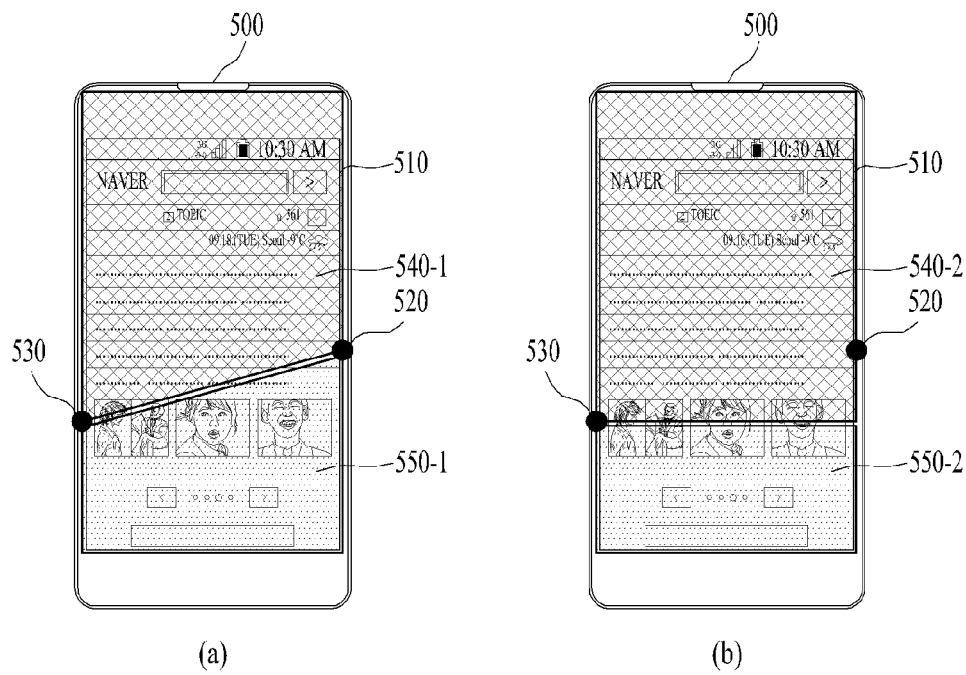
FIG. 5 illustrates areas of a front display unit of the display device, which can be controlled by a touch sensing area on the rear surface of the digital device for recognizing a double-sided touch.
Figure 5:
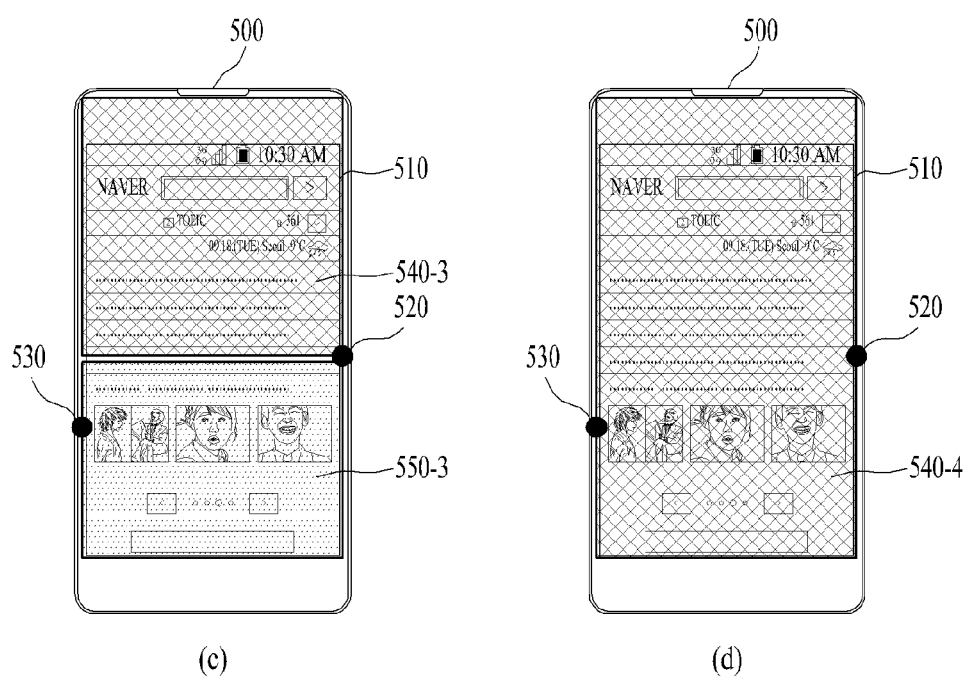

FIG. 5 illustrates areas of the front display unit of the display device, which can be controlled by the touch sensing area on the rear surface of the digital device for recognizing a double-sided touch. Specifically, FIG. 5 illustrates controllable areas of a front display unit 510 of a digital device 500 in correspondence with input signals to a touch sensing area (not shown) on the rear surface of the digital device 500.

First, as described before with reference to FIGS. 4A, 4B and 4C, when touch sensing on the rear surface is activated, the digital device 500 may provide a touch sensing area (not shown). Next, the digital device 500 may control content displayed on the front display unit 510 according to an input signal to the touch sensing area.

In this regard, a controlled area of the front display unit 510 may be a first area 540 of the front display unit 510 corresponding to the touch sensing area of the rear surface of the digital device 500. In one embodiment, referring to FIG. 4A, the touch sensing area 410-1 may include the upper area above the line connecting between the first and second points 420 and 430. In this case, the controlled area of the front display unit 510 may be a first area 540-1 corresponding to the touch sensing area (not shown), as illustrated in FIG. 5(a).

In another embodiment, referring to FIG. 4B, the touch sensing area 410-2 may include the upper area above the lower point between the first and second points 420 and 430. In this case, the controlled area of the front display unit 510 may be a first area 540-2 corresponding to the touch sensing area, as illustrated in FIG. 5(b). In another example, referring to FIG. 4C, the touch sensing area 410-3 may include the upper area above the higher point between the first and second points 420 and 430. In this case, the controlled area of the front display unit 510 may be a first area 540-3 corresponding to the touch sensing area, as illustrated in FIG. 5(*c*).

Meanwhile, referring to FIGS. 5(*a*), 5(*b*) and 5(*c*), the digital device 500 may include a second area 550 being the remaining area of the front display unit 510 except for the first area 540. Herein, the second area 550 may be an area of the front display unit that does not correspond to the touch sensing area. The digital device 500 may detect an input signal to the front display unit 510 and control content displayed in the second area 550 according to the input signal. Herein, the input signal may be a touch input, a hovering input, etc.

Further, the digital device 500 may provide different graphical effects in the first and second areas 540 and 550. For example, referring to FIG. 5, the digital device 500 may display a semi-transparent grid pattern in the first area 540 that can be controlled by an input signal to the touch sensing area of the rear surface of the digital device 500. The digital device 500 may also display a semi-transparent dot pattern in the second area 550 that can be controlled by an input signal to the front display unit 510. In this manner, the user can readily distinguish the first area 540 of the front display unit 510, controllable by an input signal to the touch sensing area on the rear surface of the digital device 500 from the second area 550 of the front display unit 510, controllable by an input signal to the front display unit 510.

Meanwhile, the controlled area of the front display unit 510 may cover the entire area of the front display unit 510 irrespective of the size and position of the touch sensing area on the rear surface of the digital device 500. In one embodiment, even though the touch sensing area occupies a part of the rear surface of the digital device 500 as illustrated in FIGS. 4A, 4B and 4C, the controlled area of the front display unit 510 may be the entire area 540-4 of the front display unit 510. In this case, the digital device 500 may control content displayed on the front display unit 510 based on a ratio between the size of the touch sensing area on the rear surface and the size of the front display unit 510, which will be described with reference to FIGS. 7A to 8C.

Figure 6A:
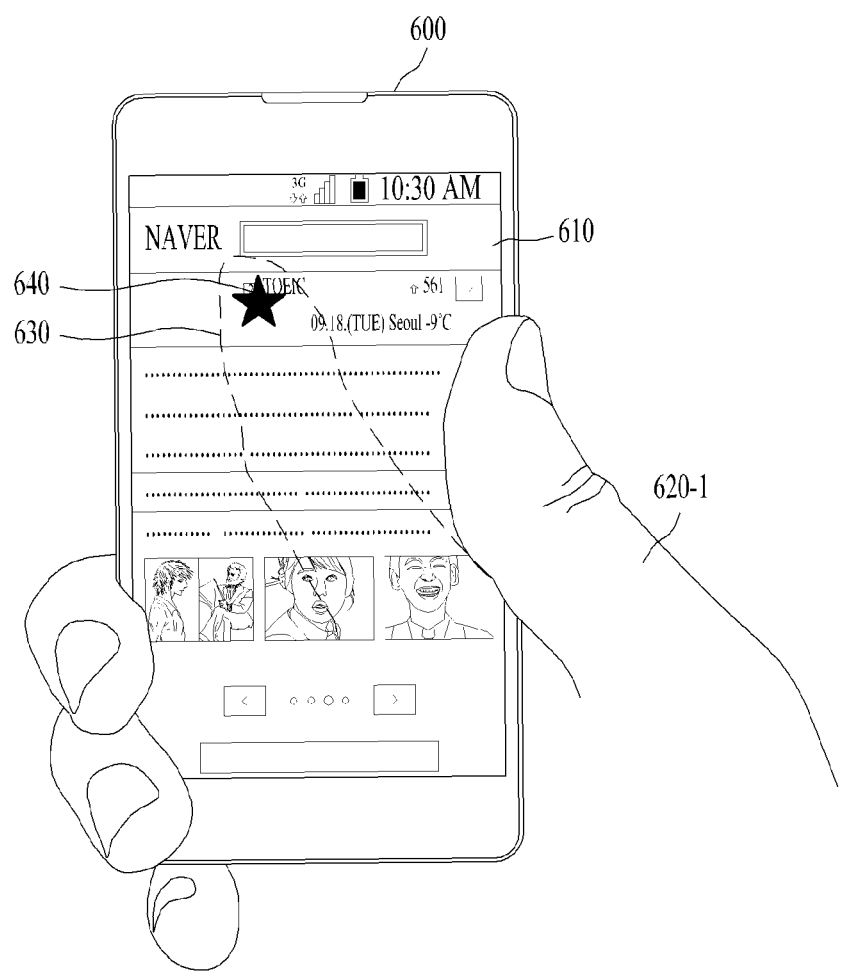
FIGS. 6A and 6B illustrate an indicator indicating the position of an input signal to the touch sensing area on the rear surface of the digital device for recognizing a double-sided touch.
Figure 6B:
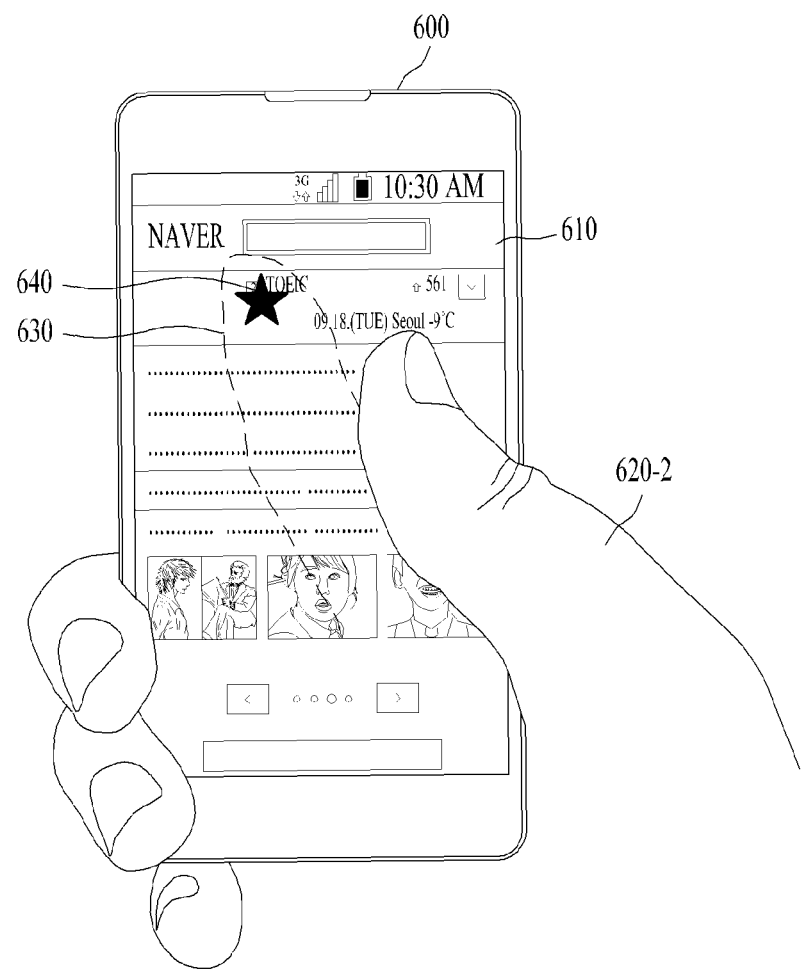

FIGS. 6A and 6B illustrate an indicator indicating the position of an input signal to the touch sensing area on the rear surface of the digital device. Specifically, FIGS. 6A and 6B illustrate detection of an input signal to a touch sensing area (not shown) on the rear surface of a digital device 600 and display of an indicator 640 corresponding to the detected input signal on a front display unit 610 by the digital device 600.

First, the digital device 600 may detect an input signal to the touch sensing area (not shown) of its rear surface. For example, the input signal may be a user's touch input, hovering input, etc. Referring to FIG. 6A, a user may apply a touch input, a hovering input, etc. with an index finger 630. Next, the digital device 600 may display the indicator 640 indicating the position of the detected input signal on the front display unit 610 in response to the input signal. In the case of an input signal to the front display unit 610, the user may recognize the position of the input signal from the position of his or her hand without the indicator 640. However, regarding an input signal to the touch sensing area of the rear surface, it may difficult for the user to recognize the position of the hand without the indicator 640 and thus the digital device 600 displays the indicator 640. For example, referring to FIG. 6A, for example, the digital device 600 may display the indicator 640 on the front display unit 610 at a position corresponding to the position of the input signal detected from the touch sensing area. Herein, the indicator 640 may take any identifiable form on the front display unit 610. For example, the indicator 640 is shaped into a star in the embodiment of FIG. 6A. The user may recognize the position of the input signal from the indicator 640 on the front display unit 610 and control content displayed on the front display unit 610.

Meanwhile, the digital device 600 may detect not only an input signal to the touch sensing area (now shown), but also an input signal to the front display unit 610. For example, the digital device 600 may detect an input signal to the front display unit 610 simultaneously with an input signal to the touch sensing area of the rear surface of the digital device 600. Referring to FIG. 6B, the digital device 600 may simultaneously detect an input signal from a user's thumb 620-2 and an input signal from a user's index ginger 630. In this case, the input signal to the touch sensing area of the rear surface may be for controlling the first area 540 described before with reference to FIG. 5 and the input signal to the front display unit 610 may be for controlling the second area 550 described before with reference to FIG. 5.

In one embodiment, upon simultaneous detection of a plurality of input signals, the digital device 600 may prioritize the input signals. The digital device 600 may control content displayed on the front display unit 600 in correspondence with a highest-priority input signal. For example, the digital device 600 may control the content displayed on the front display unit 610 based on the input signal to the touch sensing area of the rear surface among the plurality of input signals. Also, for example, the digital device 600 may control the content displayed on the front display unit 610 based on the input signal to the front display unit 610 among the plurality of input signals.

In another embodiment, upon simultaneous detection of a plurality of input signals, the digital device 600 may control content displayed on the front display unit 600 in correspondence with the plurality of input signals. For example, referring to FIG. 6B, the digital device 600 may select the content displayed on the front display unit 610 based on the input signal from the index finger 630. Also, for example, referring to 6B, the digital device 600 may scroll the content displayed on the front display unit 610 based on the input signal from the thumb 630-2.

FIGS. 7A, 7B and 7C illustrate an embodiment for controlling content displayed on the front display unit according to an input signal to the touch sensing area on the rear surface of the digital device. More specifically, FIGS. 7A, 7B and 7C illustrate control of content displayed on a front display unit in correspondence with an input signal to a touch sensing area 710 on the rear surface of a digital device 700.

First, the digital device 700 may detect a first input signal. Herein, the first input signal may include input signals detected from both side surfaces of the digital device 700, an input signal detected from the front surface or rear surface of the digital device 700, etc. Next, the digital device 700 may identify an input pattern to the digital device 700 using the first input signal. The digital device 700 may determine whether to activate touch sensing on its rear surface according to the identified input pattern.

Next, when touch sensing on the rear surface is activated, the digital device 700 may provide the touch sensing area 710. As described before with reference to FIGS. 4A, 4B an 4C, the touch sensing area 710 may be determined based on at least one of the position of a first point 740 on a first side surface of the digital device 700 and the position of a second point 750 on a second side surface of the digital device 700 opposite to the first side surface. Also, the touch sensing area 710 may be defined as an upper area above a line connecting between the first and second points 740 and 750. Herein, the first and second points 740 and 750 may be determined based on the input pattern.

Next, the digital device 700 may then detect a second input signal to the touch sensing area 710. Herein, the second input signal may include a touch input, a hovering input, etc. Referring to FIG. 7A, the second input signal may be a touch and drag of an index finger 770 in the touch sensing area 710.

Next, the digital device 700 may control content displayed on the front display unit according to the second input signal. The second input signal may include a single touch, multiple touches, a long touch, a touch and drag, hovering, etc. In addition, the digital device 700 may display an indicator 790-*a* indicating the position of the second input signal on the front display unit in response to the second input signal. As described before with reference to FIGS. 6A and 6B, the indicator 790-*a* may take any form, as far as the form indicates the position of an input signal.

In one embodiment, referring to FIG. 7B, for example, the digital device 700 may control content displayed in a first area 720-1 of the front surface of the digital device 700 through the touch sensing area 710 of the rear surface of the digital device 700. Herein, the first area 720-1 on the front surface of the digital device 700 may be a partial area of the front display unit corresponding to the position of the touch sensing area 710 on the rear surface of the digital device 700. The first area 720-1 on the front surface may be the same as the touch sensing area 710 on the rear surface in terms of size or position. In this case, the digital device 700 may control the first area 720-1 on the front surface by a user's touch input or hovering input to the touch sensing area 710 on the rear surface. For example, the user may apply a touch input or a hovering input with his or her index finger 770.

The digital device 700 may shift the indicator 790-*a* to the same position as the second input signal input to the touch sensing area 710 in the first area 720-1. Because the touch sensing area 710 is as large as the first area 720-1, 1, the indicator 790-*a* may be shifted in the first area 720-1 in the same direction as the second input signal. Referring to FIGS. 7A and 7B, for example, when the user applies a touch and drag input to the touch sensing area 710 with the index finger 770, the digital device 700 may shift the indicator 790-*a* in the first area 720-1 on the front surface of the digital device 700 in the same manner as the touch and drag input. Also, for example, if the user applies a hovering input to the touch sensing area 710 with the index finger 770, the digital device 700 may display the indicator 790-*a* at a position corresponding to the position of the hovering input in the first area 720-1 of the front surface of the digital device 700. As described before with reference to FIG. 5, the digital device 700 may further include a second area 720-2 in addition to the first area 720-1. For example, the digital device 700 may control content displayed in the second area 720-2 according to a third input signal to the front display unit. Thus the user can readily control the first area 720-1 on the front surface by a touch input to the touch sensing area of the rear surface.

In another embodiment, referring to FIG. 7C, the digital device 700 may control display of content in a front area 730 through the touch sensing area 710. Herein, the front area 730 may occupy the entire area of the front display unit. In this case, the digital device 700 may control content displayed in the front area 730 by a user's touch input or hovering input to the touch sensing area 710.

The touch sensing area 710 on the rear surface of the digital device 700 may be smaller than the front area 730 in size. Accordingly, the digital device 700 may determine a range of the front area 730 that is controlled in correspondence with the second input signal to the rear surface of the digital device 700, based on a ratio between the sizes of the touch sensing area 710 and the front area 730. For example, the digital device 700 may determine the movement speed, scrolling degree, etc. of an indicator 790-*b* displayed in the front area 730 in correspondence with the second input signal to the touch sensing area 710. For this purpose, the digital device 700 may perform scaling based on the sizes of the touch sensing area 710 and the front area 730. For example, upon detection of a sliding input with length a in the touch sensing area 710 on the rear surface, the digital device 700 may display the indicator 790-*b* as sliding by length 2*a* in the front area 730.

Meanwhile, the touch sensing area 710 illustrated in FIG. 7A and the front area 730 illustrated in FIG. 7C have the same width but different heights. Therefore, the digital device 700 may determine the movement range of the indicator 790-*b* based on different left and right heights of the touch sensing area 710. For example, as illustrated in FIG. 7A, the digital device 700 may detect a touch and drag input on a relatively low left side of the touch sensing area 710. In this case, the digital device 700 may shift the indicator 790-*b* by three times the length of the touch and drag input on a right side of the front area 730. For example, as illustrated in FIG. 7A, the digital device 700 may detect a touch and drag input on a relatively high right side of the touch sensing area 710. In this case, the digital device 700 may shift the indicator 790-*b* by twice the length of the touch and drag input on a left side of the front area 730. In this manner, the user can readily control display of content in the front area 730 of the digital device 700 by an input signal to the touch sensing area 710.

FIGS. 8A, 8B and 8C illustrate another embodiment for controlling the front display according to an input signal to the touch sensing area on the rear surface of the digital device. More specifically, FIGS. 8A, 8B and 8C illustrate control of content displayed on a front display unit in correspondence with an input signal to a touch sensing area 810 on the rear surface of a digital device 800.

First, as described before with reference to FIGS. 7A, 7B and 7C, the digital device 800 may detect a first input signal. Next, the digital device 800 may identify an input pattern to the digital device 800 using the first input signal. Next, the digital device 800 may determine whether to activate touch sensing on the rear surface according to the identified input pattern. When touch sensing on its rear surface is activated, the digital device 800 may provide the touch sensing area 810. For example, referring to FIG. 8A, the touch sensing area 810 may be defined as an upper area above the lower point between first and second points 840 and 850, that is, the second point 850.

Next, the digital device 800 may control content displayed on the front display unit according to a second input signal. In one embodiment, referring to FIG. 8B, for example, the digital device 800 may control content displayed in a first area 820-1 on its front surface through the touch sensing area 810. The first area 820-1 on the front surface of the digital device 800 may cover a part of the front display unit, corresponding to the position of the touch sensing area 810 on the rear surface. The first area 820-1 on the front surface of the digital device 800 may be the same as the touch sensing area 810 on the rear surface in size or position. In this case, the digital device 800 may control the first area 820-1 on the front surface by a user's touch input or hovering input to the touch sensing area 810 on the rear surface.

As described before with reference to FIG. 7B and as shown in FIGS. 8A and 8B, the digital device 800 may display an indicator 890-*a* at the same position as the second input signal in the first area 820-1 in response to the second input signal to the touch sensing area 810. For example, referring to FIGS. 8A and 8B, when the user applies a sliding input to the touch sensing area 810 with an index finger 870, the digital device 800 may shift the indicator 890-*a* in the first area 820-1 at the same velocity as the input velocity of the sliding input. For example, if the user applies a multi-touch input to the touch sensing area 810 with the index finger 870, the digital device 800 may display the indicator 890-1 at a position corresponding to the multi-touch input in the first area 820-1 on the front surface. Thus the user can readily control the first area 820-1 of the digital device 800 by a touch input, etc. to the touch sensing area 810.

In another embodiment, referring to FIG. 8C, the digital device 800 may control display of content in a front area 830 through the touch sensing area 810. The front area 830 may cover the entire area of the front display unit, as illustrated in FIG. 7C.

The touch sensing area 810 on the rear surface of the digital device 800 may be smaller than the front area 830 in size. Accordingly, the digital device 800 may set a range of the front area 830 controllable in response to the second input signal to the rear surface of the digital device 800 based on a ratio between the sizes of the touch sensing area 810 and the front area 830.

Unlike FIGS. 7A, 7B and 7C, the touch sensing area 810 of FIG. 8A and the front area 830 of FIG. 8C may have predetermined horizontal and vertical widths and heights. However, referring to FIGS. 8A and 8C, the touch sensing area 810 and the front area 830 may have an equal width but different heights. Therefore, the digital device 800 may display an input signal to the same size as in the touch sensing area 810 along a horizontal axis direction in the front area 830 but to a larger size than in the touch sensing area 810 along a vertical axis direction in the front area 830. In this manner, the user can readily control display of content in the front area 830 of the digital device 800 by means of an input signal to the touch sensing area 810.

Figure 9:
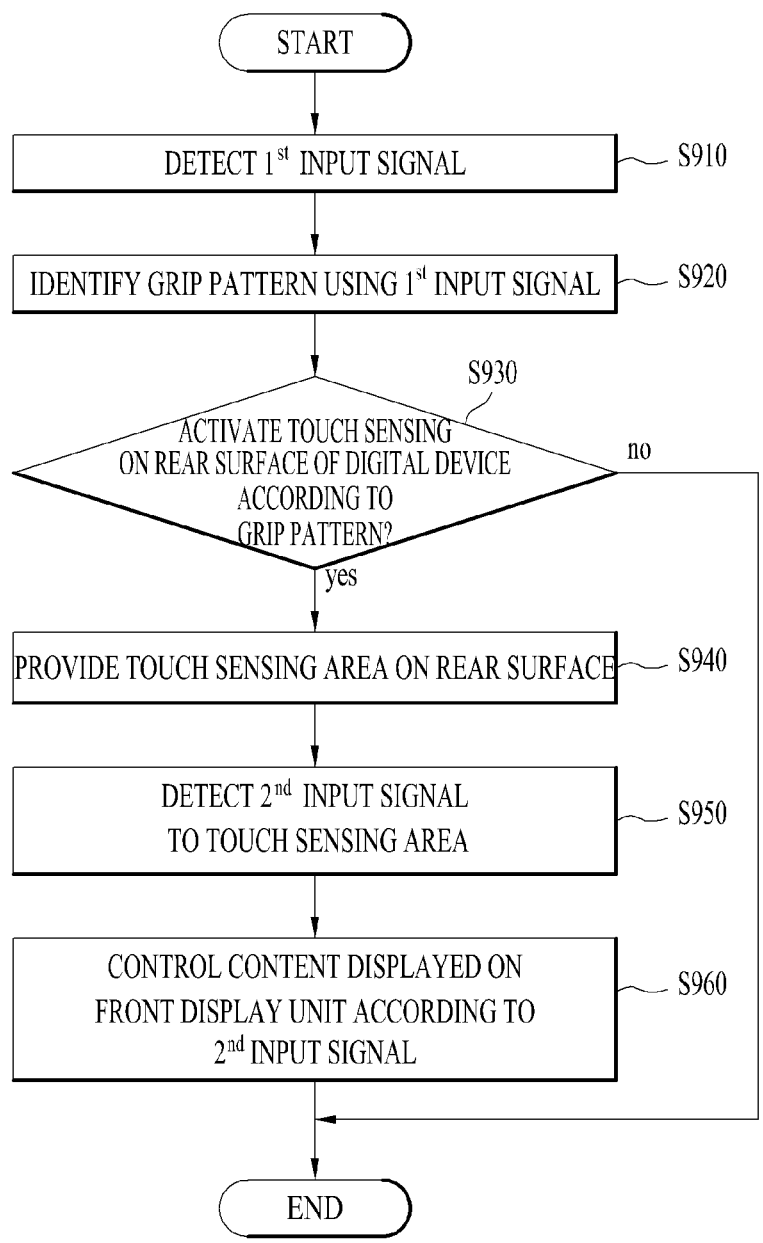
FIG. 9 is a flowchart illustrating a method for controlling the digital device for recognizing a double-sided touch.

FIG. 9 is a flowchart illustrating a method for controlling the digital device for recognizing a double-sided touch. Each step of FIG. 9 as described below may be controlled by the processor 130 of the digital device 100 illustrated in FIG. 1.

First, the digital device may detect a first input signal (S910). As described before with reference to FIGS. 4A, 4B and 4C, the first input signal may include a grip signal, a touch signal, etc. with respect to the digital device. The first input signal may be detected from the front or rear surface of the digital device or both side surfaces of the digital device.

Next, the digital device may identify an input pattern using the input signal (S920). As described before with reference to FIGS. 4A, 4B and 4C, the input pattern to the digital device may include a grip pattern detected from both side surfaces of the digital device. Also, the input pattern to the digital device may include a touch pattern on the front or rear surface of the digital device.

Next, the digital device may determine whether to activate touch sensing on its rear surface according to the identified input pattern (S930). In one embodiment, if the grip pattern is a grip having a pressure within a preset pressure range, the digital device may activate touch sensing on the rear surface. In another embodiment, if the grip pattern is a grip covering the rear surface of the digital device, the digital device may activate touch sensing on the rear surface. In another embodiment, if a touch pattern is a preset pattern, the digital device may activate touch sensing on the rear surface.

When touch sensing on its rear surface is activated in step S930, the digital device may provide a touch sensing area on its rear surface (S940). As described before with reference to FIGS. 4A, 4B and 4C, the touch sensing area on the rear surface may be determined based on at least one of the position of a first point on a first side surface of the digital device and the position of a second point on a second side surface opposite to the first side surface. The first point may be the uppermost point among one or more points on the first side surface in the identified input pattern and the second point may be the uppermost point among one or more points on the second side surface in the identified input pattern. In one embodiment, the touch sensing area may be defined as an upper area above a line connecting between the first and second points on the rear surface of the digital device. In another embodiment, the touch sensing area may be defined as an upper area above the lower point between the first and second points on the rear surface of the digital device. In another embodiment, the touch sensing area may be defined as an upper area above the higher point between the first and second points on the rear surface of the digital device.

Next, the digital device may detect a second input signal to the touch sensing area (S950). As described before with reference to FIGS. 7A, 7B and 7C, the second input signal may include a touch input, hovering input, etc. to the touch sensing area. The touch input or hovering input may be applied with a user's index finger.

Next, the digital device may control content displayed on the front display unit in correspondence with the second input signal (S960). Herein, the digital device may control display of content on the front display unit based on a ratio between the size of the touch sensing area on the rear surface and the size of the front display unit. The controlled area of the front display unit may include at least a part of the front display unit corresponding to the position of the touch sensing area on the rear surface. As described before with reference to FIGS. 6A and 6B, the digital device may display an indicator indicating the position of the second input signal on the front display unit in correspondence with the second input signal.

Figure 10:
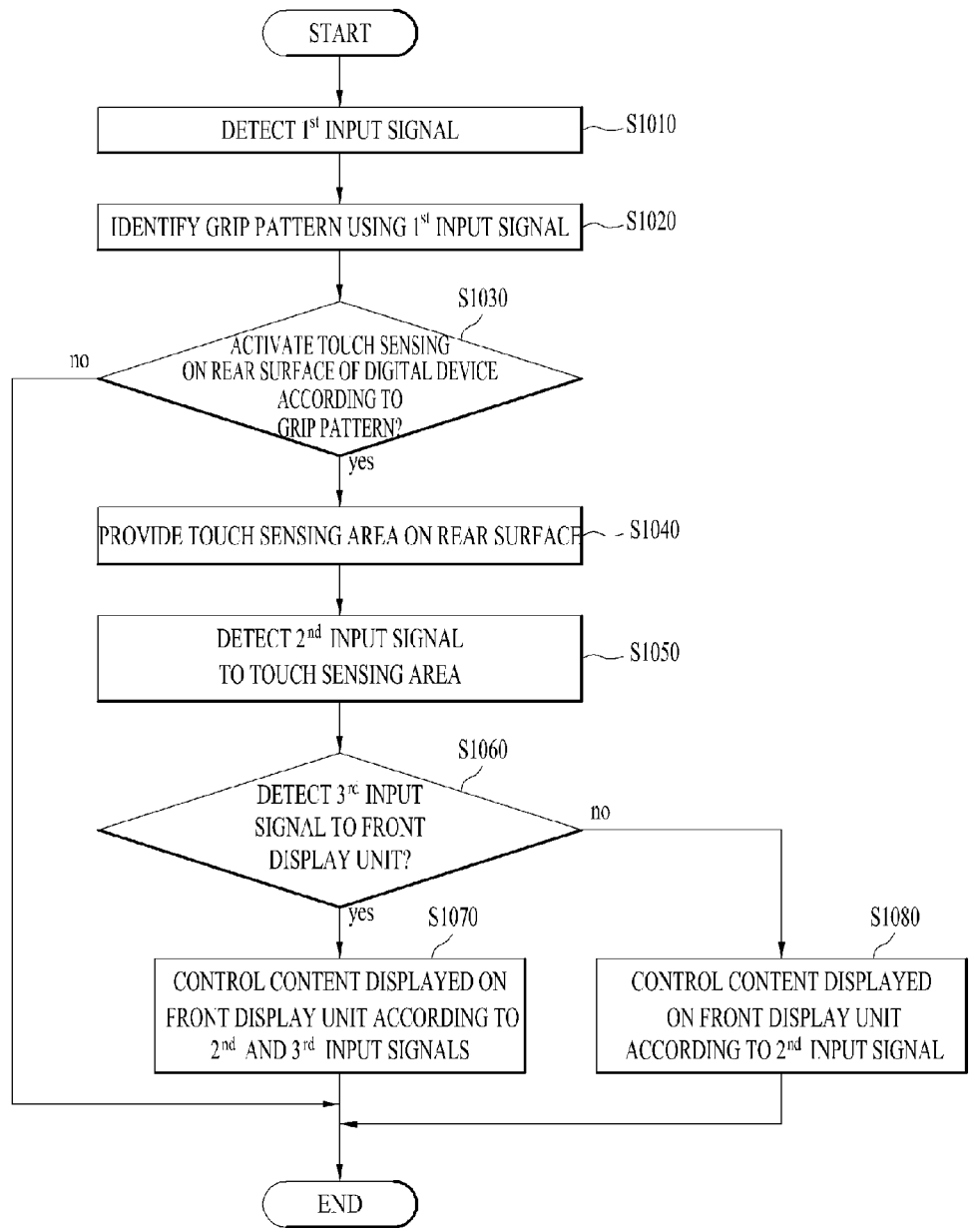
FIG. 10 is a flowchart illustrating a method for controlling the digital device for recognizing a double-sided touch.

FIG. 10 is a flowchart illustrating a method for controlling the digital device for recognizing a double-sided touch. Each step of FIG. 10 as described below may be controlled by the processor 130 of the digital device 100 illustrated in FIG. 1. A detailed description of the same or similar steps as or to steps illustrated in FIG. 9 will not be provided herein.

First, the digital device may detect a first input signal (S1010) and may identify an input pattern using the input signal (S1020). Next, the digital device may determine whether to activate touch sensing on its rear surface according to the identified input pattern (S1030) and provide a touch sensing area on its rear surface (S1040). Next, the digital device may detect a second input signal to the touch sensing area (S1050).

Next, the digital device may determine whether a third input signal to the front display unit has been detected (S1060). The third input signal is an input signal applied to the front display unit, including a touch input, a hovering input, etc. When the third input signal is detected in step S1060, the digital device may control content displayed on the front display unit based on the second and third input signals (S1070). As described before with reference to FIG. 6B, when a plurality of input signals are detected, the digital device may give priority to at least one input signal and control content displayed on the front display unit according to the at least one input signal. Also, a plurality of input signals are detected, the digital device may control content displayed on the front display unit based on the plurality of input signals.

When the third input signal is not detected in step S1060, the digital device may control content displayed on the front display unit according to the second input signal (S1072).

As is apparent from the above description, in accordance with an embodiment, it can be determined whether to activate touch sensing on the rear surface of a digital device according to a grip pattern on the digital device. Thus a touch sensing area on the rear surface of the digital device can be activated, when a user needs to. Since the size of the touch sensing area on the rear surface of the digital device can be changed according to the user's grip pattern on the digital device, touch sensing areas suitable for various grip patterns of the user can be provided.

In accordance with an embodiment, the user can control a front display unit of the digital device by applying a touch input or hovering input to the touch sensing area on the rear surface of the digital device. As a consequence, the user can readily control the front display unit with one hand.

In accordance with an embodiment, as an indicator indicating the position of a user input to the touch sensing area on the rear surface of the digital device is displayed on the front display unit, the movement of the user's index finger can readily be recognized.

In accordance with an embodiment, since the touch sensing area is provided on the rear surface of the digital device based on the pressure level of the user's grip pattern, the touch sensing area is provided only when the user wants, not always.

While the disclosure has been described with reference to separate drawings for convenience's sake, a new embodiment may be implemented by embodiments illustrated in the drawings. When needed, designing a recording medium readable by a computer to which a program for implementing the afore-described embodiments is written may fall within the scope of the disclosure.

The digital device for recognizing a double-sided touch and the method for controlling the same according to the disclosure are not restricted to the exemplary embodiments set forth herein. Therefore, variations and combinations of the exemplary embodiments set forth herein may fall within the scope of the disclosure.

The digital device for recognizing a double-sided touch and the method for controlling the same according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner.

While the disclosure has been particularly shown and described with reference to exemplary embodiments, it will be understood by those of ordinary skill in the art that various changes in form and details may be made therein without departing from the spirit and scope of the disclosure as defined by the following claims.

What is claimed is:

1. A digital device for recognizing a double-sided touch, comprising:
   a front display unit including a first region and a second region;
   a sensor unit configured to detect a touch input and transmit an input signal based on the detected touch input to a processor; and
   the processor configured to control the front display unit and the sensor unit,
   wherein the processor is further configured to:
      identify an input pattern to the digital device using a first input signal,
      determine whether to activate touch sensing on a rear surface of the digital device according to the identified input pattern,
      provide a touch sensing area on the rear surface of the digital device, when touch sensing on the rear surface of the digital device is activated, wherein a size of the touch sensing area is determined based on at least one of a position of a first point on a first lateral side of the digital device and a position of a second point on a second lateral side opposite to the first lateral side, and wherein the first and second points are determined based on the input pattern,
      control content displayed on the first region of the front display unit according to a second input signal to the touch sensing area, and
      control content displayed on the second region of the front display unit according to a third input signal to the second region of the front display unit.

2. The digital device according to claim 1, wherein the input pattern to the digital device includes a grip pattern detected from both lateral sides of the digital device.

3. The digital device according to claim 2, wherein the processor is configured to activate touch sensing on the rear surface of the digital device, when pressure of the grip pattern is in a preset pressure range.

4. The digital device according to claim 2, wherein the processor is configured to activate touch sensing on the rear surface of the digital device, when the grip pattern is a grip covering the rear surface of the digital device.

5. The digital device according to claim 1, wherein the input pattern to the digital device includes a touch pattern on a front surface or the rear surface of the digital device.

6. The digital device according to claim 1, wherein the first point includes an uppermost point among at least one point on the first lateral side of the digital device in the identified input pattern and the second point includes an uppermost point among at least one point on the second lateral side of the digital device in the identified input pattern.

7. The digital device according to claim 1, wherein the touch sensing area includes an upper area above a line connecting between the first and second points on the rear surface of the digital device.

8. The digital device according to claim 1, wherein the touch sensing area includes an upper area above a lower point between the first and second points on the rear surface of the digital device.

9. The digital device according to claim 1, wherein the controlled area of the front display unit includes at least a part of the front display unit corresponding to a position of the touch sensing area on the rear surface of the digital device.

10. The digital device according to claim 1, wherein the processor is configured to control the content displayed on the front display unit based on a ratio between a size of the touch sensing area on the rear surface of the digital device and a size of the front display unit.

11. The digital device according to claim 1, wherein the processor is configured to display an indicator indicating a position of the second input signal on the front display unit according to the second input signal.

12. The digital device according to claim 1, wherein the processor is configured to control the content displayed on the front display unit according to a third input signal to the front display unit, when touch sensing on the rear surface of the digital device is not activated.

13. The digital device according to claim 1, wherein the first region and the second region is determined based on the size of the touch sensing area.

14. A method for controlling a digital device for recognizing a double-sided touch, the method comprising:
  detecting a first input signal;
    identifying an input pattern to the digital device using the first input signal;
    determining whether to activate touch sensing on a rear surface of the digital device according to the identified input pattern;
    providing a touch sensing area on the rear surface of the digital device, when touch sensing on the rear surface of the digital device is activated, wherein a size of the touch sensing area is determined based on at least one of a position of a first point on a first lateral side of the digital device and a position of a second point on a second lateral side opposite to the first lateral side, and wherein the first and second points are determined based on the input pattern;
  detecting a second input signal to the touch sensing area;
  controlling content displayed on a first region of a front display unit according to the second input signal;
  detecting a third input signal to a second region of the front display unit; and
  controlling content displayed on the second region of the front display unit according to the third input signal.

15. The method according to claim 14, wherein the input pattern to the digital device includes a grip pattern detected from both lateral sides of the digital device.

16. The method according to claim 14, wherein the determining whether to activate touch sensing on the rear surface of the digital device comprises activating touch sensing on the rear surface of the digital device, when pressure of the grip pattern is in a preset pressure range.

17. The method according to claim 14, wherein the determining whether to activate touch sensing on the rear surface of the digital device comprises activating touch sensing on the rear surface of the digital device, when the grip pattern is a grip covering the rear surface of the digital device.

18. The method according to claim 14, wherein the input pattern to the digital device includes a touch pattern on a front surface or the rear surface of the digital device.

19. The method according to claim 14, wherein the first point includes an uppermost point among at least one point on the first lateral side of the digital device in the identified input pattern and the second point includes an uppermost point among at least one point on the second lateral side of the digital device in the identified input pattern.

20. The method according to claim 14, wherein the touch sensing area includes an upper area above a line connecting between the first and second points on the rear surface of the digital device.

21. The method according to claim 14, wherein the controlling of content displayed on the front display unit comprises controlling the content displayed on the front display unit based on a ratio between a size of the touch sensing area on the rear surface of the digital device and a size of the front display unit.

* * * * *